United States Patent
Rocka

[11] Patent Number: 6,088,956
[45] Date of Patent: Jul. 18, 2000

[54] FOLDABLE PLANT SUPPORT STRUCTURE AND SYSTEM

[76] Inventor: Arthur J. Rocka, P.O. Box 557, 650 Madison St., Port O'Connor, Tex. 77982

[21] Appl. No.: 09/121,193

[22] Filed: Jul. 22, 1998

[51] Int. Cl.$^7$ .................................................. A01G 17/06
[52] U.S. Cl. ............................................. 47/45; 211/201
[58] Field of Search ................................. 47/44, 45, 47, 47/28.1; 211/181.1, 195, 201

[56] References Cited

U.S. PATENT DOCUMENTS

| | | | |
|---|---|---|---|
| 912,184 | 2/1909 | Scott ........................................ | 47/28.1 |
| 2,014,175 | 9/1935 | Hart ............................................ | 47/44 |
| 3,113,400 | 12/1963 | Emond ....................................... | 47/45 |
| 3,299,569 | 1/1967 | Lemrick . | |
| 4,005,548 | 2/1977 | Nahon . | |
| 4,073,091 | 2/1978 | Vogel . | |
| 4,285,163 | 8/1981 | Booker . | |
| 4,667,438 | 5/1987 | Corell . | |
| 4,858,380 | 8/1989 | Gayle . | |
| 4,860,489 | 8/1989 | Bork . | |
| 4,894,951 | 1/1990 | Risley ........................................ | 47/45 |
| 5,174,060 | 12/1992 | Glamos . | |
| 5,179,799 | 1/1993 | Hillstead . | |
| 5,323,559 | 6/1994 | Allman . | |
| 5,343,654 | 9/1994 | Paquin et al. . | |
| 5,544,446 | 8/1996 | Benson, Jr. . | |
| 5,850,927 | 12/1998 | Pan ..................................... | 211/181.1 |

Primary Examiner—Michael J. Carone
Assistant Examiner—Jeffrey L. Gellner
Attorney, Agent, or Firm—Sherman D. Pernia

[57] ABSTRACT

A foldable plant support system is described which provides a structure within which a plant may be grown and physically supported, and over which a protective cover may be drawn to provide a protective environment for a plant contained within the structure, and an irrigation system. The system may be used as a "hotcap" or "mini greenhouse" with the support structure and cover providing a protective environment for a seedling, new plant or the like. As the plant matures or as the weather dictates, the cover may be removed. The plant support structure has two or more vertical members and number of cross members connected to each other by a rotatable connector assembly which provide the foldable feature of the structure. A vertical member typically is rod-like and extend the entire height of the structure and has attachment points where it is attached to a connector assembly. The vertical member also includes a staking structure, which is used to anchor the plant support structure in place when in use. Loop shaped cross members are connected to and extend laterally from the vertical members, and each has attachment points for attaching the cross member to a connector assembly. The connector assembly provides a rotatable or pivotable attachment means for rotatable connecting a vertical member to a cross member. An exemplary connector is a hub and an axle assembly, with the hub having a passage for closely receiving and retaining one end of the axle.

17 Claims, 9 Drawing Sheets

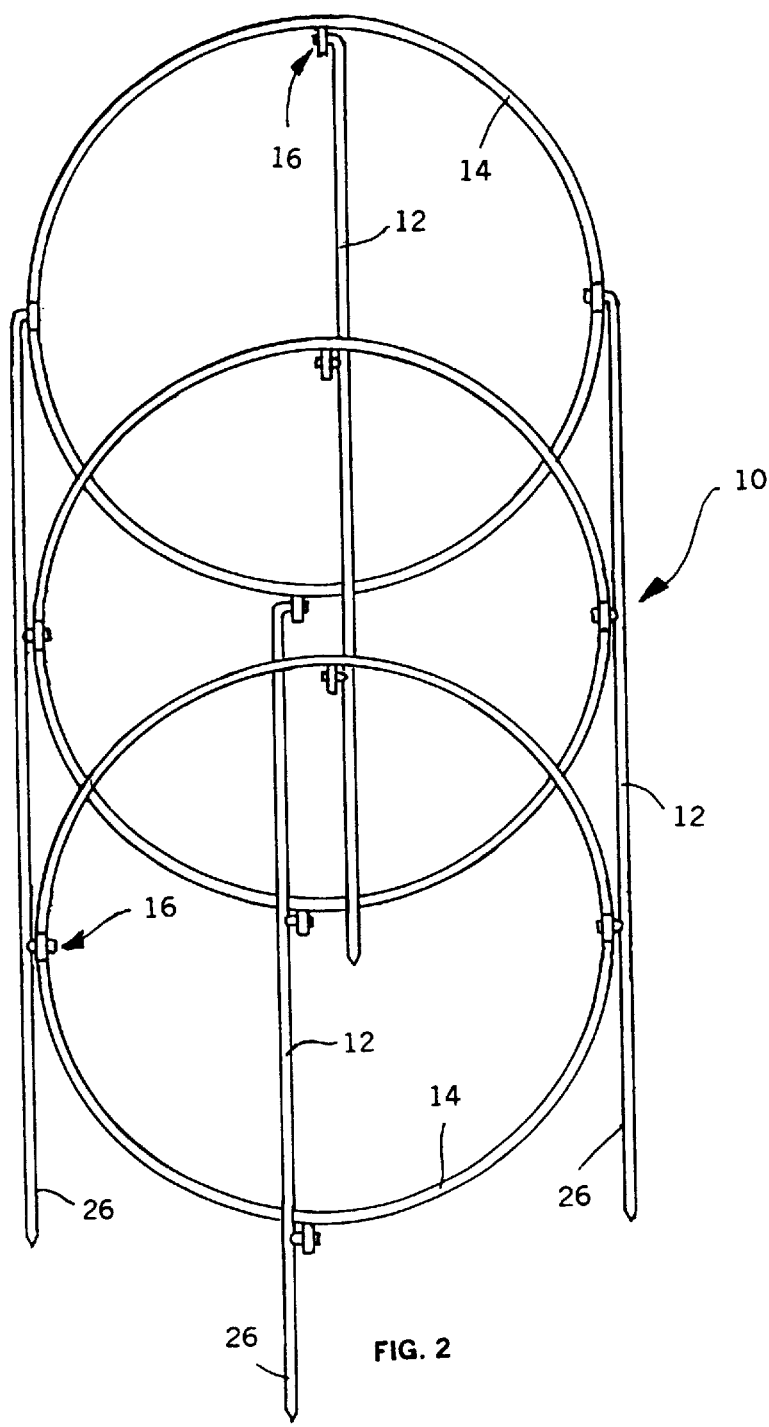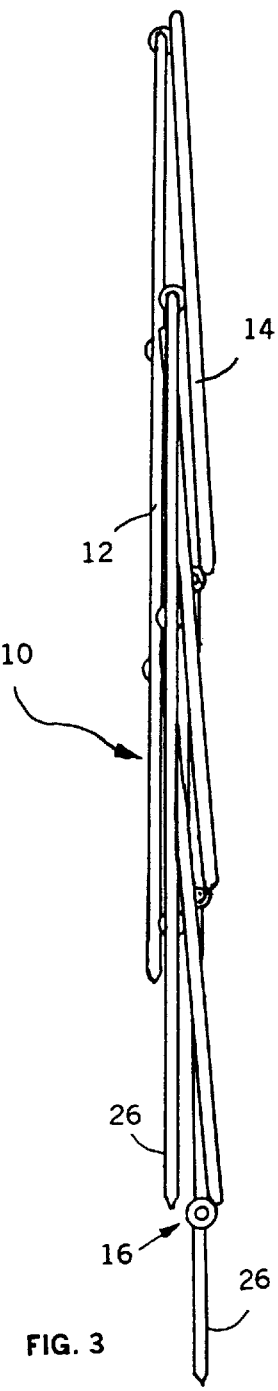
FIG. 2
FIG. 3

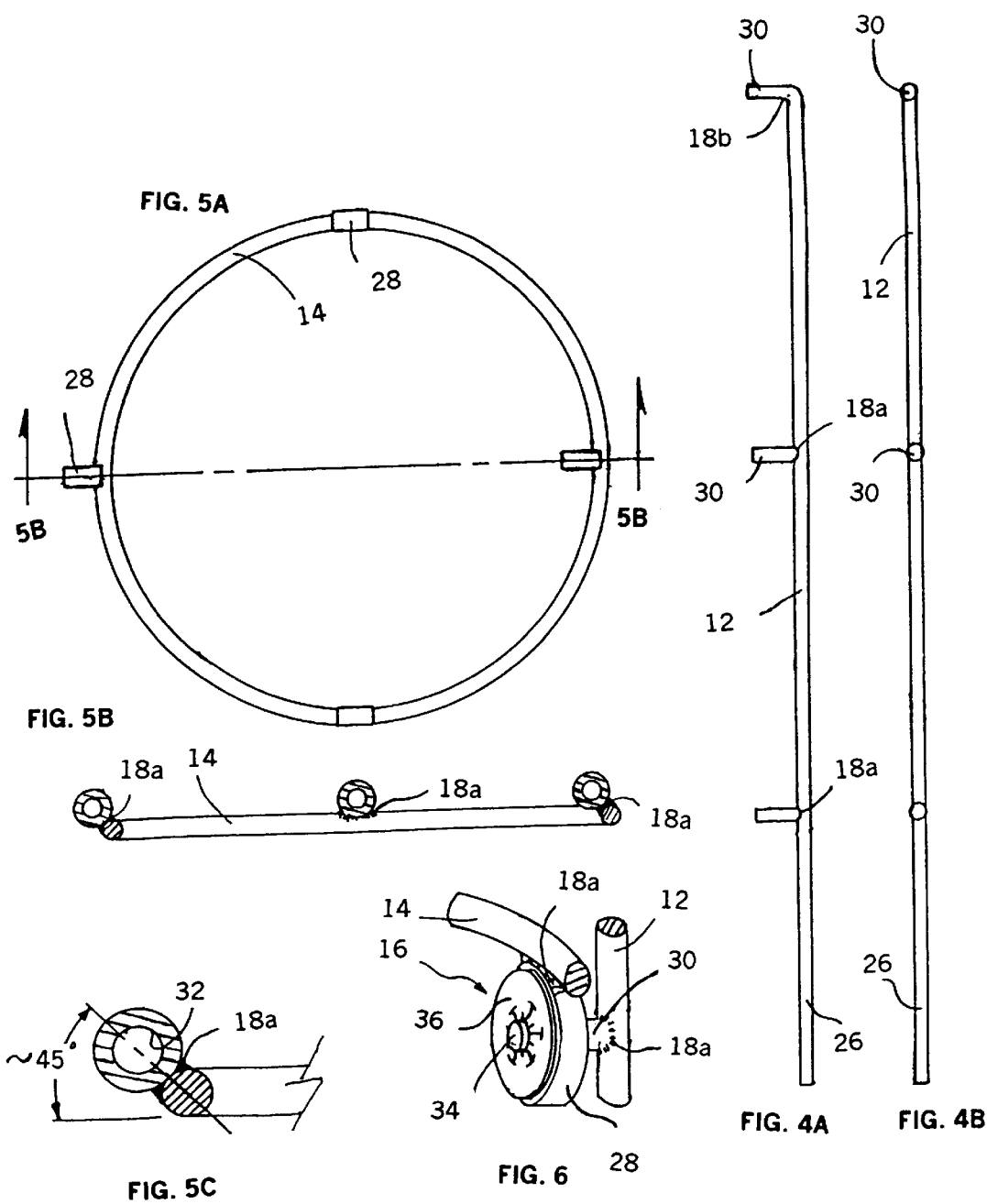

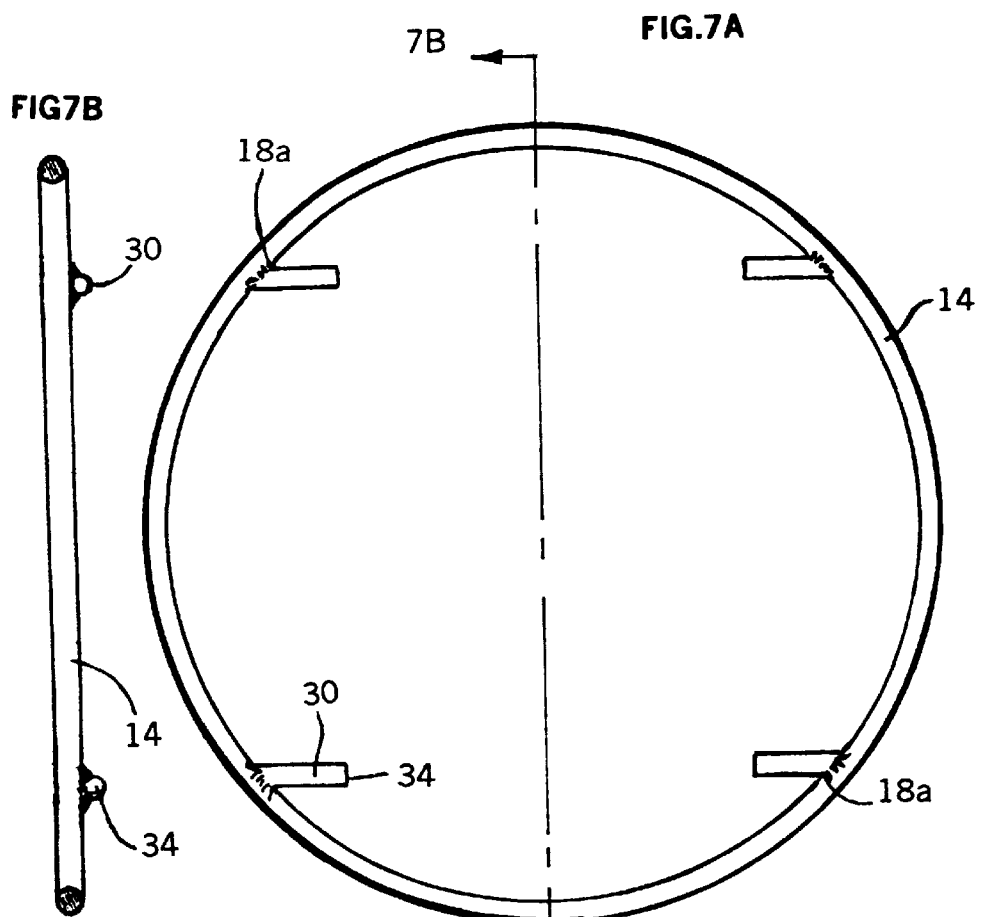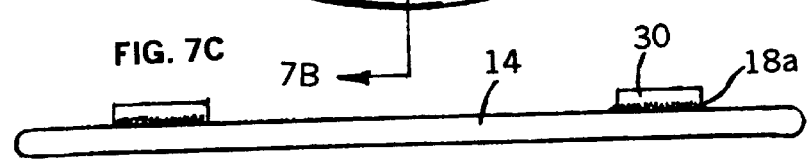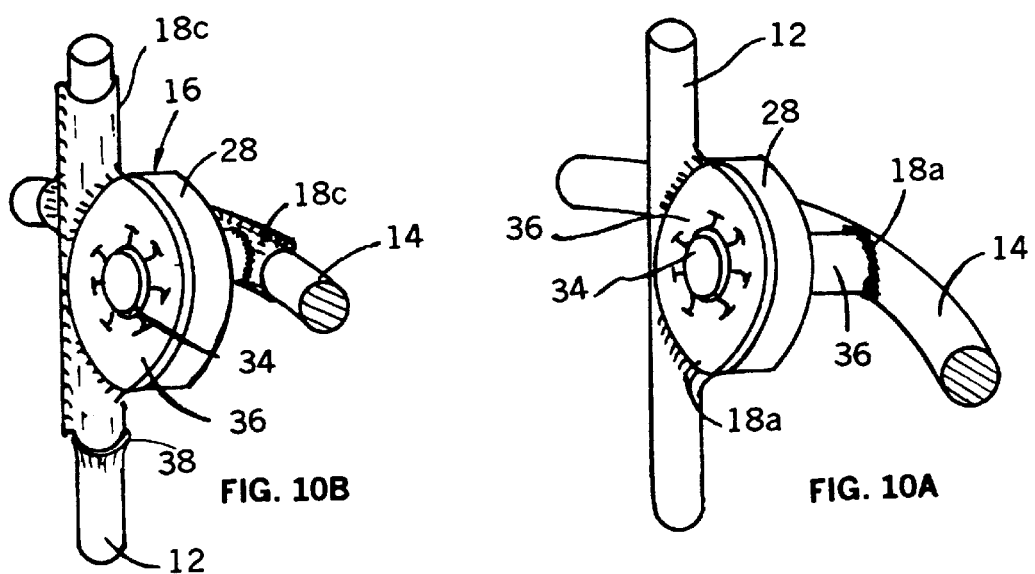

FOLDABLE PLANT SUPPORT STRUCTURE AND SYSTEM

FIELD OF THE INVENTION

The present invention is in the field of botanical support structures. More specifically, it relates to a seasonal use plant support structure that may be selectively adapted to provide both a protective environment and physical support means to a growing plant contained within it, and an irrigation system as well.

BACKGROUND OF THE INVENTION

Plant supports have been used by gardeners ranging from the professional to the casual since before recorded time. There truly have been innumerable alternatives devised for providing auxiliary support to a growing plant. These alternatives can range from a simple stake in the ground to an automated, high-tech, controlled environment greenhouse. Despite the plethora of alternatives historically available, the utility or desirability of any specific alternative is always defined by the totality of the circumstances impacting a given user.

In today's consumer society in the U.S., both the hobbyist and the professional alike can have quite unique requirements for a plant support system that differ from their historical predecessors of even a few generations ago. These include ready commercial availability (and all the inherent considerations that go into a commercial product), simplicity and ease of use, durability, broad application and efficient storage. Of course, the industry has been motivated to develop a variety of plant supports to address one or more of these desirable features. Some examples follow.

Booker, U.S. Pat. No. 4,285,163, describes a four-sided, collapsible plant enclosure. The enclosure may have screened sides for growing plants safe from rodents and other intruders. However, the screened sides when practiced with the invention are not removable, nor does the invention have a top closure. Vogel, U.S. Pat. No. 4,073,091, describes another four-sided plant support that is foldable in the flat plane of the sides. Benson, U.S. Pat. No. 5,544,446, describes a plant support similar to Booker and Vogel in that it is foldable in the plane of its side, but provides for a support that may have more than four sides. However, the means for staking the Benson support to the ground requires separate elements, whereas in Booker and Vogel the staking means are integral to the support.

Nahon, U.S. Pat. No. 4,005,548, describes an alternative plant support which employs a plurality of upright rods and cross wires which may be assembled by the end user in order to provide the erected support structure. However, after use, this structure requires substantial disassembly before it can be stored in a compacted configuration. Another support structure assembled by the end user is that of Hilistead, U.S. Pat. No. 5,179,799. However, the Hilistead support differs from the Nahon support in that it is readily dissemble able for storage, but requiresbreaking the support down into its separate component parts. There are still other structures that are neither collapsible nor foldable, but provide a reduced storage space requirement by nesting multiple structures when more than one structure is to be stored. Such supports include those of Lemrick, U.S. Pat. No. 3,299,569, and Glamos, U.S. Pat. No. 5,174,060, and the prior typical cone-shaped tomato cage.

Additionally, there are plant support structures that although they are protective, they are not collapsible or foldable to provide a reduced volume configuration to increase storage efficiency. For example, Gayle, U.S. Pat. No. 4,858,380, describes a plant support having a wire mesh guard structure for completely enclosing a plant, with two different cross-sections and a lid for accessing the enclosed plant.

In view of the above, there is still the need in the field for alternative plant support systems that combine the benefits of having simple, integrated structural components, support structures that are easily erected for use and readily foldable for efficient storage, and which can provide both a protective environment as well as physical support as desired by the user.

SUMMARY OF THE INVENTION

The present invention is a foldable plant support system which provides a structure within which a plant may be grown and physically supported, and upon a protective shroud, canopy or slip cover supported on the structure to provide a protective environment a for a plant contained within the structure, and a soaker ring for irrigating the plant. In use, the present invention may initially be used as a "hotcap" or "mini greenhouse" with the support structure and shroud providing a protective environment for a seedling, new plant or the like. As the plant matures or as the weather or season permits, the shroud may be removed and the invention may provide physical support to the growing plant. The structure is particularly adapted to support fruit bearings limbs of a plant contained within it as they grow outward from the structure. The support system comprises a foldable plant support structure having two or more vertical members, a number of cross members which connect to the vertical members, the combination of which provides the structure of the support. The vertical members and cross members are connected to each other by a number of rotatable connector assemblies which provide the foldable feature of the invention. Besides a separate protective shroud which may be used to cover the structure and a plant contained therein, the plant support system also includes an irrigation means having a soaker ring for watering the plant.

Vertical members typically are rod-like and extend the entire height of the structure. Vertical members may be constructed of any suitable material, such as metal or plastic, depending on the specific application for the structure. Each vertical member has a plurality of attachment points where the vertical member is attached to a connector assembly. The attachment points are spaced apart at similar positions along the length of the vertical members. A vertical member has a cross-section configured to provide appropriate support for its use in view of its composition and construction. The cross-section may be configured both as to its area and geometry as practicable by one of ordinary skill in the art. The vertical member also includes a staking structure, which may be accomplished by having a section of the vertical member extend below the lowest attachment point on the vertical member. The staking structure is used to anchor the plant support structure in place when in use by inserting the stake portion into the ground.

A cross member typically has a loop configuration, where the loop may be in the shape of a circle, an oval, a rectangle, or a triangle, as desired for a particular application. Cross members are connected to and extend laterally from the vertical members. Cross members may be constructed of any suitable material, such as metal or plastic, depending on the specific application for the structure. The cross members also each have a plurality of attachment points for attaching the cross member to a connector assembly. The attachment points on the cross members of a given support structure are similarly positioned along on each cross member.

The connector assembly provides a rotatable or pivotable attachment means for rotatable connecting a vertical member to a cross member. Typically, two to six such connector assemblies are used to connect a cross member to as many vertical members. It is the rotatable interface between the vertical members and cross members provided by the connectors that accomplish the foldable feature of the plant support structure. The connector assembly may comprise any means which provides for rotation of the vertical member relative to the cross member. One such means is a hub and an axle assembly, with the hub having a cylindrical passage for closely receiving and retaining one end of the axle. The axle may be retained in the hub by application to the one end of the axle (the free end) of a retaining means. Such retaining means are known to the ordinary skilled artisan and include a fastener (such as a push or other type of nut), an upset, a swage, and a crimp.

The connector assembly may be attached to a vertical member or a cross member by any of a number of means known to one of ordinary skill in the art, such as welding to, molding in, forming of and clipping to the member.

Attachment points are the positions on a vertical member or cross member where a component of a connector assembly is attached to the member. Attachment may be accomplished by any of a variety of means known to the skilled artisan. These include welding, soldering, molding, forming, and clipping the connector to the member. Where attachment is accomplished by clipping a connector component to a vertical or cross member, the member may be configured with a detent to fix the location of the attachment point and restrict movement of the connector once it is in place. A vertical member has a sufficient number of attachment points to provide the desired number of cross members for the structure. Typically, two to six attachment points are incorporated into each vertical member of a structure, but even more may be used if desired.

In the plant support structure of the present invention, the cross-member may have between two and ten attachment points or even more for a specific application. For most typical applications, between two and six attachments are anticipates. The attachment points on cross-members are spaced apart either substantially symmetrically or at a substantially equidistances along the length of the cross member.

Another feature of the present invention is a removable protective shroud or slip cover for covering the support structure when it is in use in an unfolded configuration. The use of the shroud in combination with the support structure allows protection of a plant from adverse environmental conditions. The shroud or slip cover may be constructed to generally protect a plant contained in the support structure from such specific risks as birds, frost, sun, insects and the like. Appropriate materials for and configuration of (e.g., mist net, fine mesh, or the like) the shroud or slip cover is selectable by the ordinary skilled artisan in consideration of the kind of protective environment desired. An aspect of the protective shroud is that it may be configured as a fitted sleeve for drawing over the support structure. To facilitate accomplishing this feature the support structure may be constructed to provide a smooth, non-catch outer aspect, such aspect to prevent or reduce snaring of the slip cover or fitted sleeve when installing it. A further aspect of the fitted sleeve is that it may have one end that is closed or closeable. The sleeve of the shroud may have a number of closable openings through it to facilitate access to the plant contained therein. Such openings may be self-closing or have other types of closures as practicable by the ordinary skilled artisan.

The protective cover feature in combination with the support structure provides a portable and easily erectable "mini-greenhouse" and the inherent benefits attendant therewith for growing plants. Such benefits include preventing damage to a plant contained therein from frost, wind, hard rain, hail sun scorch and animal pests. The slip cover itself can include such benefits as being breathable and reusable. Further, the slip cover may be left in place until the leaves of a plant contained therein touch the material of the slip cover.

Another feature of the present plant support system is a soaker ring which provides an irrigating means for use in association with a support structure. The soaker ring is designed to be modular and have redundant interchangeable component parts. This design facilitates interconnection of individual soaker rings to provide an irrigation system for use with multiple plant support structures. Further, the modular and redundant aspect of the components enables the user to tailor the layout of the irrigation system to suit the user's individual need.

A further feature of the present invention is that similar support structures may be stacked one on top of another to provide a support structure of an increase height as desired by the user. Stacking may include fixing the upper structure to the lower structure. This may be accomplished by fixing the bottom cross member of the upper structure to the top cross member of the lower structure. Alternatively, the ground stake of the upper structure may be fixed to a cross member or vertical rods of the lower structure. Various means of fixing the stacked support structure together are known and readily practicable by one of ordinary skill in the art.

A further additional feature of the present plant support system is a kit containing embodiments of the various features of the invention in a package. The kit may contain embodiments of all of the features of the present plant support system or a subset thereof.

BRIEF DESCRIPTION OF THE DRAWINGS

FIG. 2 is a frontal view showing the support structure in its storage configuration having been folded in the plane of the cross members.

FIG. 3 is a side view showing the support structure in its storage configuration.

FIGS. 4A & 4B are views of a vertical member showing (A) a side view (B) a front view of axles attach to the vertical member.

FIGS. 5A, 5B & 5C are views of a circular loop cross member showing: (A) a top view indicating placement attachment points and orientation of connector assembly hubs on the loop; (B) a sectional view of the cross member through the plane 5B of FIG. 5A; and (C) is a detailed sectional view of the 45° offset attachment of the outside hub of a secondary pair of hubs.

FIG. 6 is a combined perspective and sectional view of an axle-hub type connector assembly welded or soldered to the attachment points.

FIGS. 10A & 10B show attachment points where the hub and axle components of a connector assembly are have attachment points that are (A) weld or solder type or (B) clip-on type. Note that the clip-on type attachment point in (B) includes a detent on the vertical member to help fix the location of the connector assembly.

DETAILED DESCRIPTION OF THE INVENTION

Referring now to the embodiments shown in the figures, it may be seen that the present invention is a plant support system comprising a foldable or collapsible plant support structure, a removable protective shroud for covering the support structure when erected, and an irrigation system for watering the plant.

Figure 1:
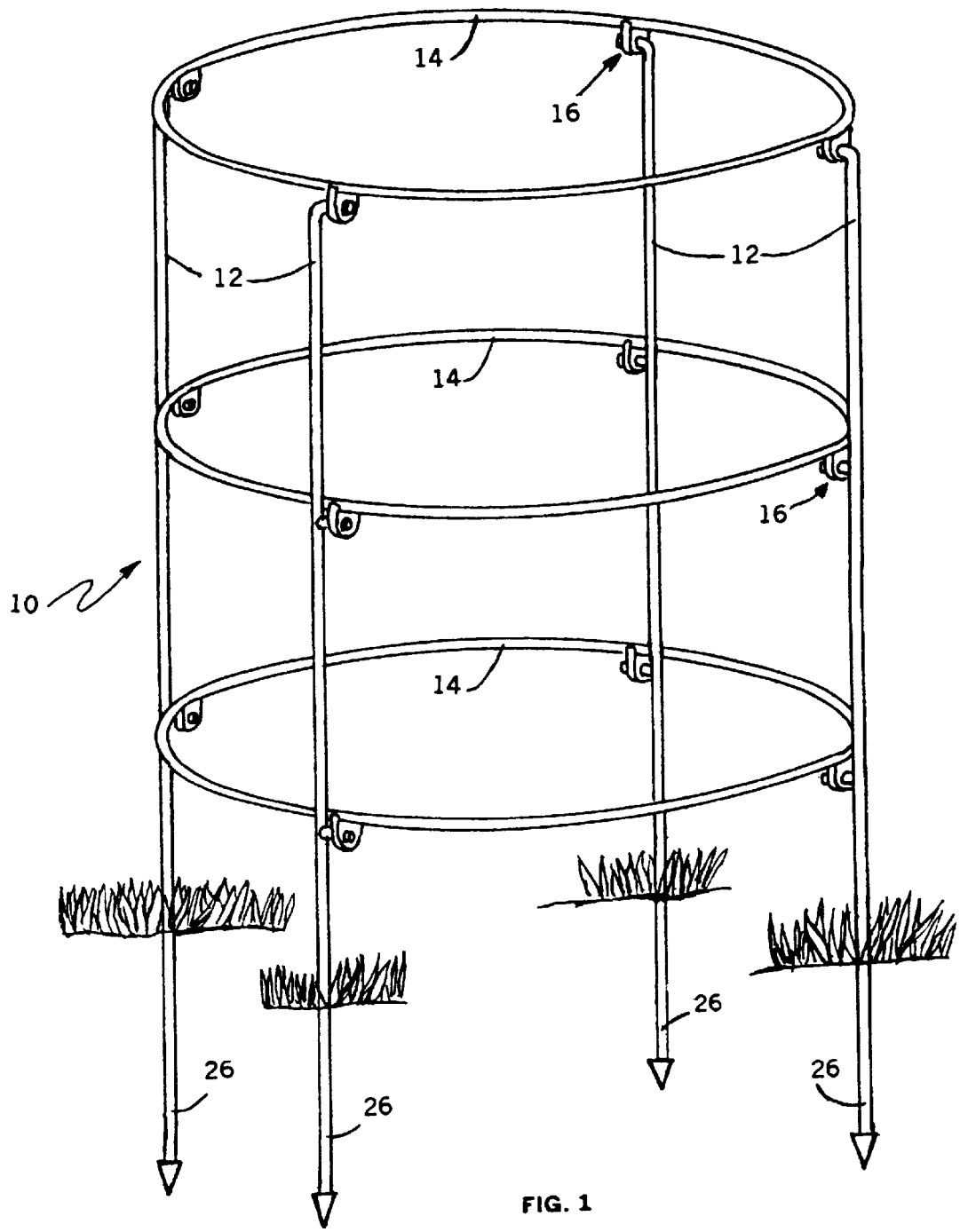
FIG. 1 is a perspective view showing the support structure in an erected condition and staked into the ground.

FIGS. 1 to 3 show a preferred embodiment of a foldable or collapsible plant support structure 10 of the present invention in both its erected (FIG. 1) and folded (FIGS. 2 & 3) configurations. When erected as in FIG. 1, the plant support structure 10 provides for containing a plant within the framework of the structure and may also provide support for the limbs, branches etc. of a plant as it grows. As shown in FIGS. 2 & 3, the plant support structure 10 is foldable upon itself to reduce its volume and provide for more efficient storage of the device when not in use. The foldable plant support structure 10 comprises two or more rod-like vertical members 12 (see FIGS. 4A & 4B, 8A & 8B and 9), two or more cross members 14 (see FIGS. 5A–5C and FIGS. 7A–7G), and a number of rotatable connector assemblies 16 (see FIG. 6) for connecting vertical members 12 to cross members 14.

As shown in FIGS. 4A & 4B, each vertical member has a plurality of attachment points 18 for connecting the vertical member 12 to a connector assembly 16. Attachment points 18 are spaced apart along the length of one side of the vertical member 12. Like wise, as shown in FIG. 5B, each cross member 14 has a plurality of attachment points 18 for connecting the cross member 14 to a component of a connector assembly 16, with the attachment points 18 being spaced apart along the surface of the cross member 14. Further, the attachment points 18 are appropriately positioned on the surface of the cross member 14 to enable the vertical 12 and cross 14 members of support structure to fold together from an unfolded or erected configuration. The attachment points 18 are locations on a member 12 or 14 for fixing the member 12 or 14 to a connector assembly 16. Such fixing of a connector assembly 16 at an attachment point may be accomplished by a means such as: welding or soldering 18a, molding (not shown), forming 18b, clipping 18c or other means known to one of ordinary skill in the art. Where an attachment point 18c (see FIG. 10B) provides for locating a clip-on connector assembly, it may comprise a detent 38 of some type to restrict movement of the connector assembly 16 once it is in place (see FIG. 10B).

The vertical member 12 has a cross-section configured to provide appropriate support for its use in view of its composition and construction. A vertical member 12 may further include a stake portion or structure 26, the stake 26 being a section of the vertical member 12 extending below the lowest attachment point 18 and for inserting into the ground. The stakes 26 are used to fix an erected plant support structure 10 into the ground and give the structure 10 stability.

Preferable, a cross member 14 has a loop configuration. As shown in FIGS. 5A and 5B, the loop typically will have a circular configuration. However, other configurations may be practiced, including an oval, a rectangle and triangle (see FIGS. 7D to 7F). Also, a cross-member 14 may have from two to ten attachment points 18, and preferable from two to four attachment points 18. The cross-members attachment points 18 may be spaced apart symmetrically around the length of the cross-member 14, including being spaced apart at a substantially equidistance along the length of the cross member 14.

Connector assemblies 16 rotatably connect the vertical members 12 to cross members 14, and are disposed to provide a foldable plant support structure 10. In a preferred embodiment shown in FIGS. 6, a connector assembly 16 comprises a hub 28 and an axle 30. The hub has a passage 32 (see FIG. 5C), typically cylindrical, for receiving and retaining the one free end of the axle 34. The axle 30 typically is closely received and retained within the hub 28 so as to provide for rotation relative to each other of the hub 28 about the axle 30. The axle 30 may be retained within the hub 28 by any of a variety of means known to one of ordinary skill in the art, such as: application to the one end of the axle 34 (free end) of a retainer 36. A retainer 36 may be readily accomplished using a fastener (like a push nut as shown in FIG. 6A), an upset, a swage, a crimp or other means known to one of ordinary skill in the art. A component part of a connector assembly 16 may be fixed to a member 12 or 14 at an attachment point by any of a variety of means practicable by the ordinary skilled artisan, including: welding or soldering 18a, molding or forming 18b and clipping 18c. A component part of the connector assembly 16 is fixed to an attachment point 18 on a vertical member 12 and a complimentary component part of the connector 16 is fixed to an attachment point 18 on a cross member 14.

In a preferred embodiment shown in FIGS. 4a & 4B, the plant support structure comprises vertical members 12 having attachment points 18a that each connect a vertical member 12 to the butt end of a connector assembly axle 30, each axle having one free end 34 and a butt end. The cross-members 14 in this embodiment have attachment points 18a that each connect the cross member 14 to a connector assembly hub 28. In this embodiment, the cross-member 14 has four equal spaced attachment point 18a to a hub 28 (at 180° in this embodiment) as shown in FIG. 5A. Further, positioning of the hubs 28 relative to the cross member 14 comprises one (or primary) pair of hubs 28 being opposite each other and in line with the cross member 14, and the other (or secondary) pair of hubs 28 being opposite each other and perpendicular to the cross members and offset 45° (see FIG. 5C) one to the inside and one to the outside of the crossmember, as shown in the figure.

Figure 7F:
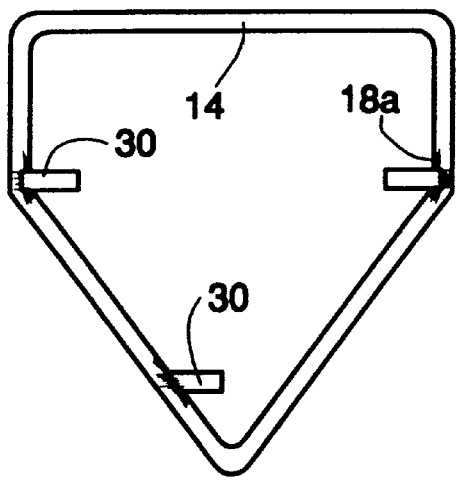
FIGS. 7A, to 7G are views of various configuration of cross member loops.
Figure 7E:
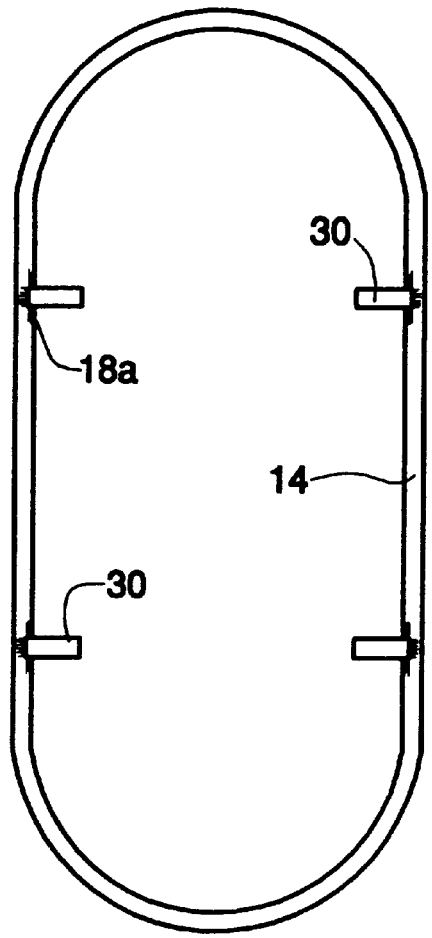
Figure 7D:
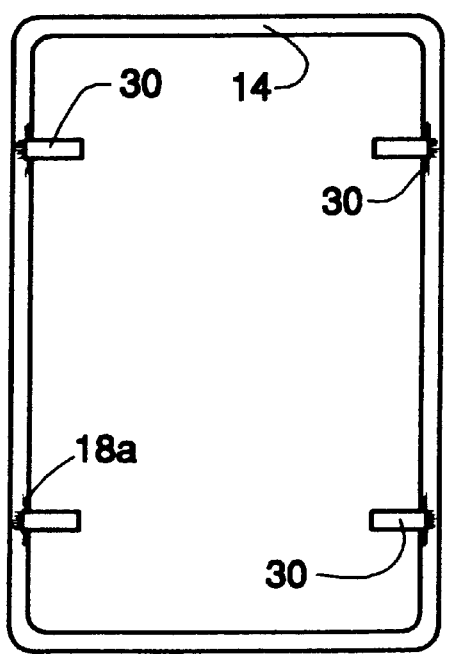
Figure 7G:
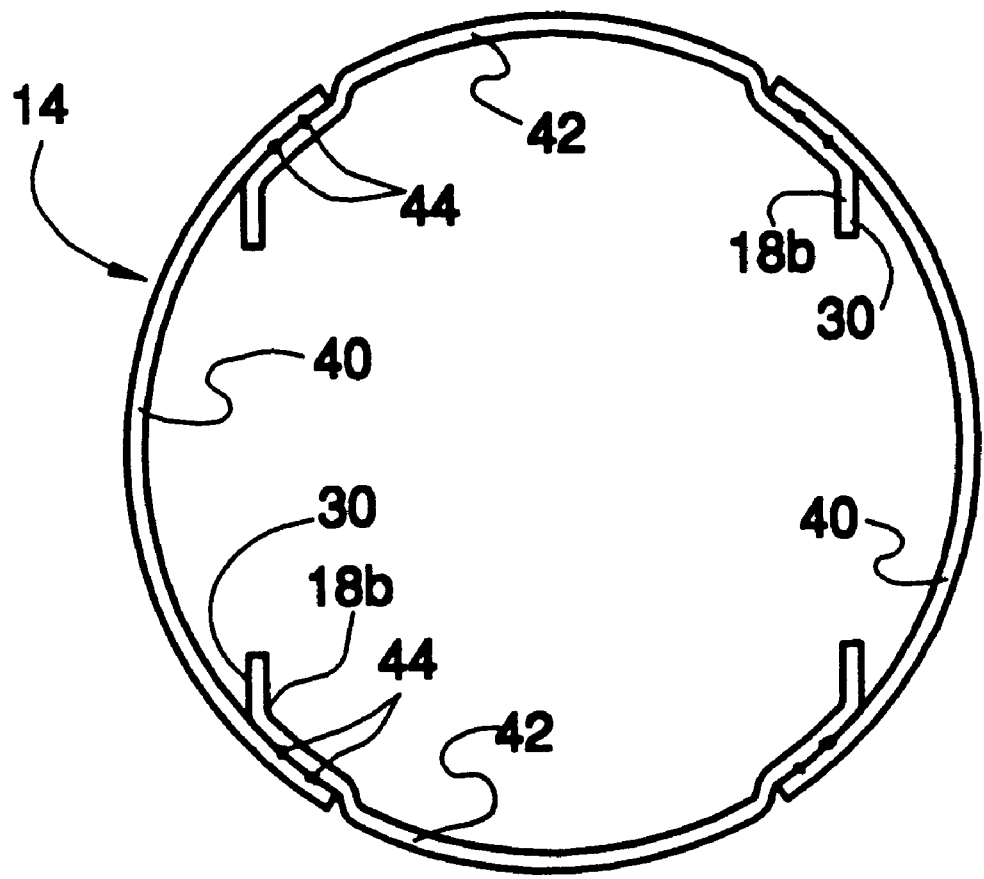

An alternative preferred embodiment the present plant support structure 10 is shown in FIGS. 7 to 11. In this embodiment as shown in FIGS. 7A to 7G, cross-members 14 have attachment points 18 that each connect the cross member 14 to the butt end of a connector assembly axle 30. The cross-member 14 has four attachment points 18 each to an axle 30. The attachment points 18 may be positioned in pairs symmetrically across plane 7B as shown in FIG. 7A.

or as shown in FIG. 7F. Further, the one free end 34 of each axle 30 is oriented toward the inside of the loop of the cross member 14 with the axle 30 perpendicular to the line of plane 7B. FIG. 7G shows how a cross member 14 of this embodiment may be easily fabricated to have formed attachment points 18b by being composed of a pair of simple arcs 40 and a pair of compound arcs 42 fixed together as shown (by a weld/solder type joint 44). Other of the cross member loops shown in FIGS. 7A to 7F may be similarly accomplished.

Figures 8A, 8B, 9:
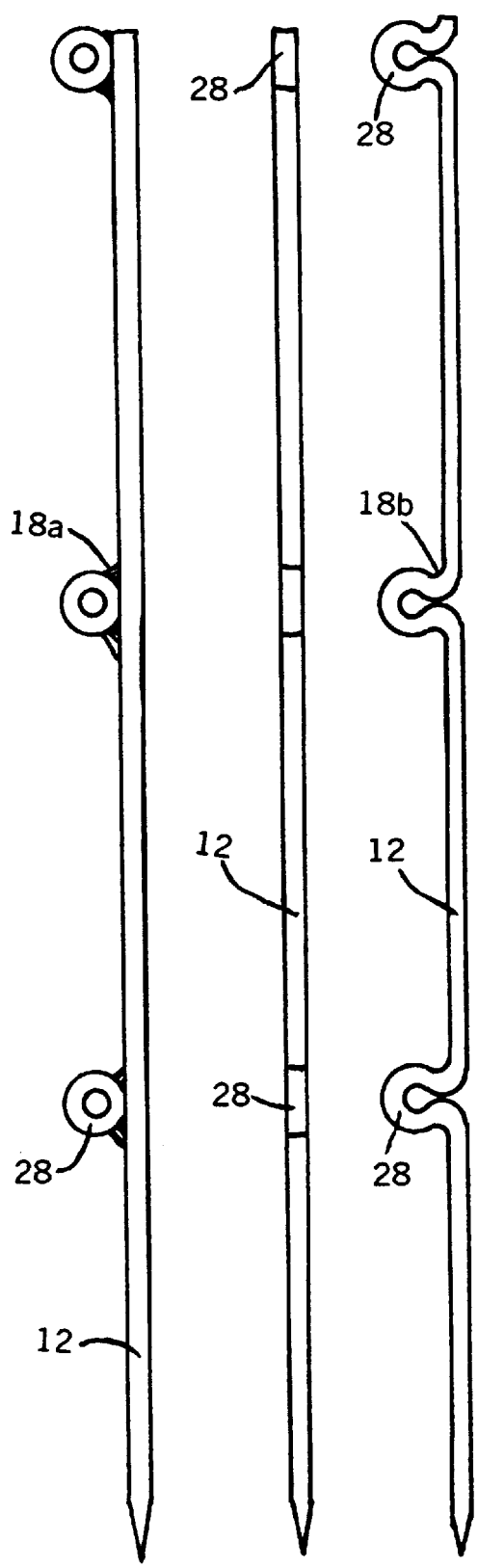
FIGS. 8A & 8B are (A) side and (B) front views of hubs attached to a vertical member.
FIG. 9 is a side view of a vertical member showing formed hubs at attachment points.
Figure 11:
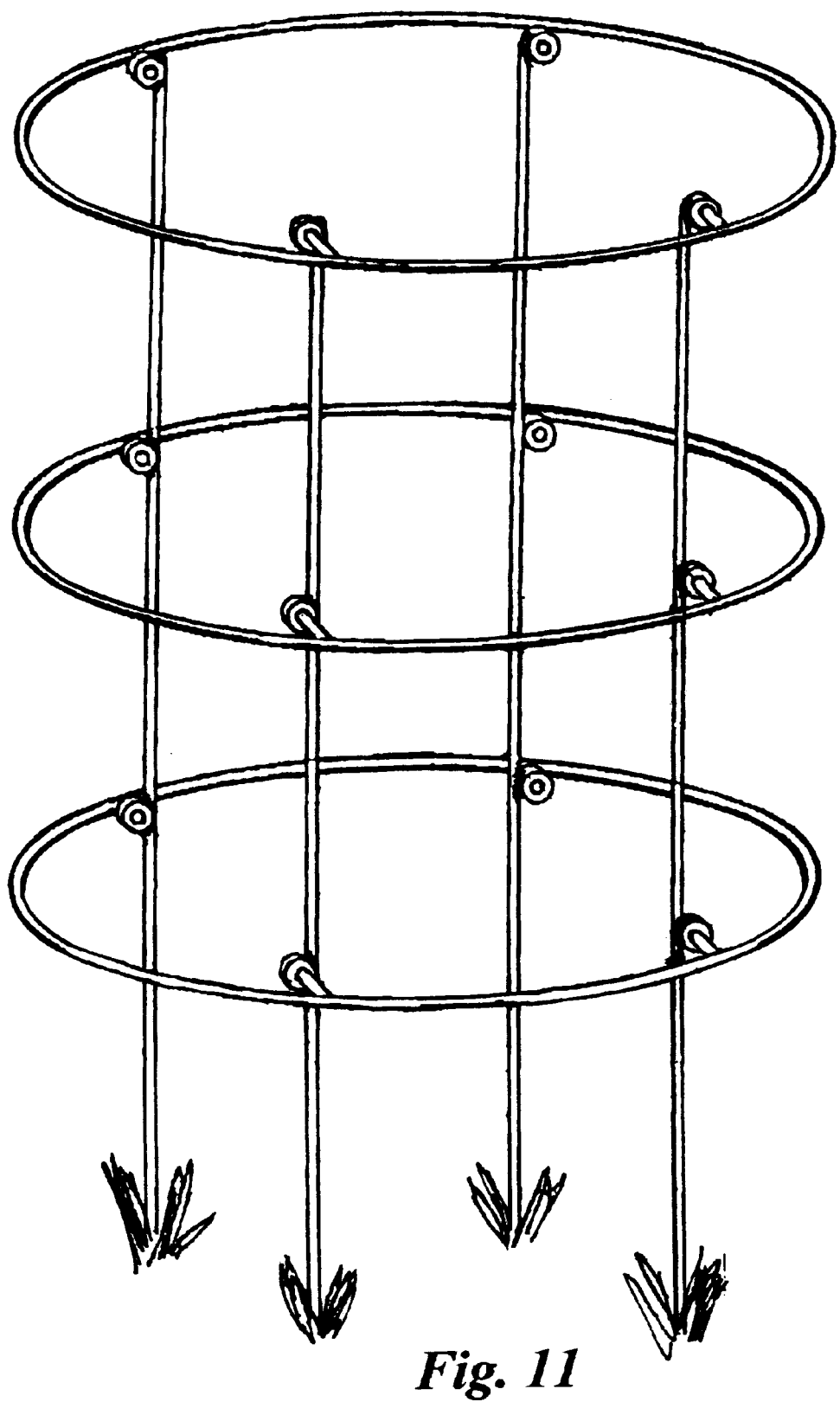
FIG. 11 is a perspective view showing the support structure in an erected condition and staked into the ground, and having the cross members be the outer most surface feature of the structure.

As shown in FIGS. 8 & 9, vertical members 12 have attachment points 18 that each connect a vertical member 12 to a hub 28 of a connector assembly 16, each hub 28 having a passage 32, typically cylindrical, for receiving and retaining the one free end of the axle 34. FIG. 10 shows a connector 16 comprising a hub 28 and axle 30 assembly for use with this embodiment and having a hub 28 fixed to a vertical member 12 and axle 30 fixed to a cross member 14. As shown in FIG. 11, the cross members 14 are the external most feature on the structure 10 of this embodiment, and present a relatively non-snaring or non-snagging outside surface of the support structure 10.

Figure 12:
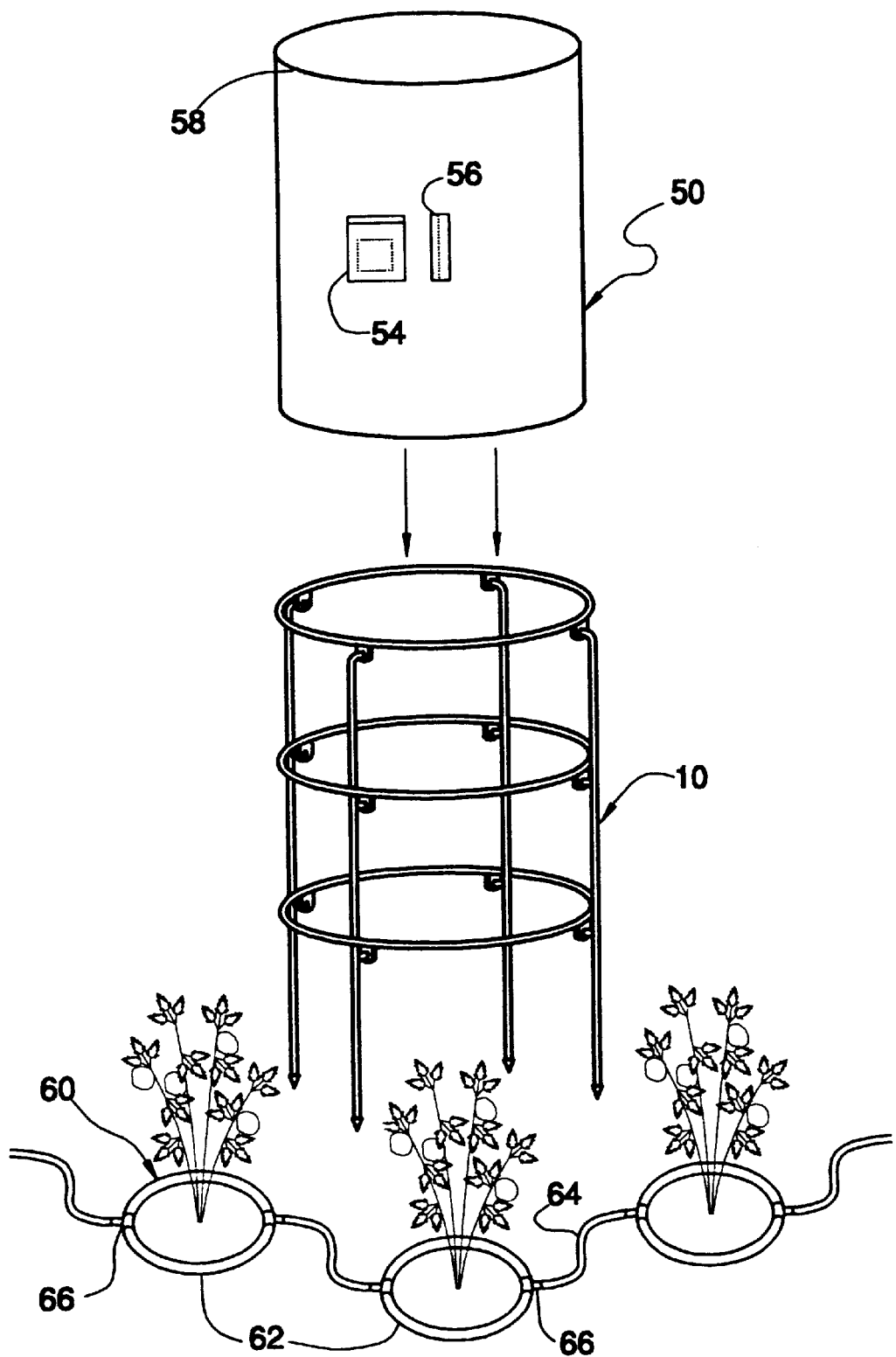
FIG. 12 shows the plant support system of the present invention including a foldable plant support structure, a removable protective cover, and an irrigation system.

In a preferred embodiment shown in FIG. 12, the plant support system of the present invention comprises a foldable plant support structure 10, a removable protective cover 50 for covering the plant support structure when it is erected, and an irrigation system 60 for watering a plant contained within the plant support structure 10. In this embodiment of the plant support system, a removable protective shroud, canopy or slip cover 50 is provided for covering the support structure 10 when in use. Preferable, the protective cover 50 is configured as a fitted sleeve for drawing over the support structure 10. Further, the protective cover 50 comprises a fitted sleeve that has a closed or closeable end 52. The end 52 may be closable by a zipper 58 or other means practicable by the ordinary skilled artisan. Further, the protective cover 50 may incorporate a number of closable openings through it, in addition a closable top 52, to facilitate access to the plant contained therein, for example to harvest fruit or tend the plant. Preferably, such openings can be self-closing, for example, a flap 54 that is weighted, or has ties or fasteners (e.g., VELCRO®-type closure), or a slot with over-lapping edges 56, a zipper closure 58 or have other types of closures as practicable by the ordinary skilled artisan.

The irrigation system 60 comprises a soaker ring 62 which provides a watering means for use in association with the support structure 10. The irrigation system 60 comprises the soaker ring 62 and other ancillary components which are modular and redundant interchangeable components. The modular and redundant interchangeable components facilitate interconnection of individual soaker rings 62 to provide an irrigation system 60 for use with multiple plant support structures 10. The ancillary components of the irrigation system 60 includes interconnect hose 64 for connecting soaker rings 62 into the water source of the irrigation system 60 and standard, commercially available garden-type hose fitting assemblies 66.

While the above description contains many specifics, these should not be construed as limitations on the scope of the invention, but rather as exemplifications of one or another preferred embodiment thereof. Many other variation are possible, which would be obvious to one skilled in the art. Accordingly, the scope of the invention should be determined by the scope of the appended claims and their equivalents, and not just by the embodiments.

What is claimed is:

1. A foldable plant support structure comprising:
    a plurality of vertical members, each having a plurality of attachment points for connecting the vertical member to a connector assembly, the attachment points similarly spaced apart along a length of each vertical member;
    a plurality of cross members, each having a plurality of attachment points for connecting the cross member to the connector assembly, the attachment points similarly spaced apart along a length of each cross member; and
    a connector assembly, having a hub member and an axil member for rotatably connecting vertical members to the cross members, and the connector disposed to provide a plant support structure capable of being folded substantially flat in a plane of the cross members.

2. The plant support structure of claim 1 wherein the vertical member has a cross-section configured to provide appropriate support for its use in view of its composition and construction.

3. The plant support structure of claim 1 wherein the attachment points provide for connecting to the connector assembly by a means selected from the group consisting of: welding, soldering, molding, forming, or clipping.

4. The plant support structure of claim 1 wherein the attachment points are detents.

5. The plant support structure of claim 1 wherein the vertical member further comprises a staking structure, the staking structure being a section of the vertical member extending below the lowest attachment point and for inserting into the ground.

6. The plant support structure of claim 1 wherein the cross member has a loop configuration.

7. The cross member of claim 6 wherein the loop has a configuration similar to a shape selected from the group consisting of a circle, an oval, a rectangle, and a triangle.

8. The plant support structure of claim 1 wherein the cross-member has between two and ten attachment points.

9. The plant support structure of claim 1 wherein the cross-members have attachment points spaced apart symmetrically around the length of the cross-member.

10. The plant support structure of claim 1 wherein the connector assembly comprises a hub and an axle assembly, the hub having a cylindrical passage for closely receiving and retaining one end of the axle, and providing for rotation of the hub and the axle relative to each other.

11. The connector assembly of claim 10 wherein the axle is retained in the hub by application to the one end of the axle of a retaining means selected from the group consisting of a fastener, an upset, a swage, or a crimp.

12. The plant support structure of claim 1 wherein the connector assembly is attached to the vertical member and the cross member by a means selected from the group consisting of welding to, molding in, forming of and clipping to the member.

13. The plant support structure of claim 1, wherein the cross member further comprises two primary and two secondary hubs attachment points, and the primary hub attachment points are 180° apart and the primary hubs are in line with the cross member, and secondary hub attachment points are 180° apart and the secondary hubs are perpendicular to the cross members and offset 45° one to the inside and one to the outside of the cross member.

14. The plant support structure of claim 1 further comprising a removable protective shroud for covering the support structure in an unfolded configuration.

15. The plant support structure of claim 14 wherein the protective shroud comprises a sleeve for drawing over the support structure.

16. The protective shroud of claim 15 wherein the fitted sleeve comprises one end that is closed or closeable, and a tubular body that has closable ports for accessing an inside of the tubular body from an outside of the tubular body.

17. A foldable plant support structure comprising:

a plurality of vertical members, each having a plurality of attachment points for connecting the vertical member to a connector assembly, the attachment points similarly spaced apart along a length of each vertical member, and providing for connecting to the connector assembly by a means selected from the group consisting of: welding, soldering, molding, forming, or clipping, and a staking structure, the staking structure being a section of the vertical member extending below the lowest attachment point and for inserting into the ground;

a plurality of cross members, each having a loop configuration and a plurality of attachment points for connecting the cross member to the connector assembly, the attachment points similarly spaced apart symmetrically along a length of each cross member, and having at least two primary and two secondary attachment points, and the primary attachment points being 180° apart and in line with the cross member, and secondary attachment points being 180° apart and perpendicular to the cross members and offset 45° one to the inside and one to the outside of the cross member; and a connector assembly, having a hub and an axle assembly, the hub having a passage for closely receiving and retaining the axle to provide for rotation of the hub and the axle relative to each other, the axle being retained in the hub by application to the axle of a retaining means selected from the group consisting of a fastener, an upset, a swage, or a crimp, and the connector assembly being attached to the vertical member and the cross member by a means selected from the group consisting of welding to, molding in, forming of and clipping to the member to provide for rotatably connecting the vertical member to the cross member, and the connector disposed to provide a plant support structure foldable in the plane of the cross members.

* * * * *